Patented Mar. 16, 1948

2,438,019

UNITED STATES PATENT OFFICE 2,438,019

METHOD FOR PREPARING FUMARIC NITRILE

Henry A. Pace, Akron, Ohio, assignor to Wingfoot Corporation, Akron, Ohio, a corporation of Delaware No Drawing. Application July 23, 1946, Serial No. 685,781

12 Claims. (Cl. 260—464)

This invention relates to a new method of preparing fumaric nitrile from fumaramide and particularly to an improvement in the method of dehydrating fumaramide by means of phosphorus pentoxide.

The use of phosphorus pentoxide in converting amides to nitriles is well known and widely practiced. However, when such methods are used in preparing fumaric nitrile from fumaramide, low yields are obtained, due to the decomposition of the fumaramide to form a tarry material, a difficulty not encountered with the commoner nitriles. To improve the yields, a substantial excess of phosphorus pentoxide and a high vacuum have been employed.

The purpose of this invention is to provide an improved method requiring a minimum quantity of phosphorus pentoxide and inexpensive equipment for producing the desired fumaric nitrile in substantial yields. It has been found that if fumaramide is treated with phosphorus pentoxide by heating in the presence of a metal powder, substantial yields of the desired nitrile are obtained. This method does not require the use of vacuum and the customary excess of phosphorus pentoxide.

The new method is performed by mixing three moles of fumaramide with approximately two molecular equivalents of phosphorus pentoxide and a small proportion of a metallic powder, for example, zinc dust, and rapidly heating the mixture to the distillation temperature. Any metal powder which is stable under ordinary atmospheric conditions of temperature, pressure and humidity may be used, for example, magnesium, cadmium, zinc, iron, aluminum and other metals which are more electropositive than hydrogen except for the alkali metals and the alkali earth metals. Such metals exist in free form under the usual conditions of the reaction and will react with the generated phosphoric acid to evolve gaseous hydrogen.

The reaction which takes place when aluminum powder is used, is as follows:

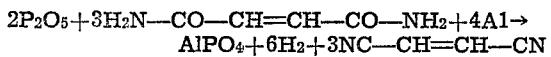

Accordingly, it will be noted that two moles of phosphorus pentoxide are used for every three moles of fumaramide converted to nitrile. There is no need for an excess of phosphorus pentoxide as is customary in prior art methods. Less than the theoretical proportions of phosphorus pentoxide may be used, but lower yields of the nitriles are then obtained.

Further details of the preparation are set forth with respect to the following specific examples.

Example 1

A 500 cc. two-necked flask was charged with 23 grams of finely pulverized fumaramide, 19 grams of phosphorus pentoxide and 26 grams of zinc dust. The flask was connected to a similar flask immersed in ice water. The reaction mass was stirred and the temperature rose to 290° C. in 10 minutes. The fumaric nitrile began to distill at 180° C. and was completely liberated within five minutes. A yield of 66 percent of the fumaric nitrile was obtained.

Example 2

The preparation described in Example 1 was repeated except that 7.5 grams of aluminum powder was used in place of the 26 grams of zinc dust. A yield of 85 percent of fumaric nitrile was obtained.

Several preparations of fumaric nitrile were made in the presence of phosphorus pentoxide, but without the addition of a metal powder. No yield in excess of 40 percent was obtained, thereby demonstrating the advantages of the use of metal powder in the preparation of fumaric nitrile.

Although the invention has been described with respect to specific modifications, it is not intended that the details thereof shall be construed as limitations upon the scope of the claims except to the extent incorporated in the following claims.

I claim:

1. A method of preparing fumaric nitrile which comprises heating a mixture of fumaramide, phosphorus pentoxide and a powder of a metal having an electropositive potential less than that of each of the alkali metals and alkali earth metals.

2. A method of preparing fumaric nitrile which comprises heating a mixture of fumaramide, approximately two moles of phosphorus pentoxide for every three moles of fumaramide and a powder of a metal having an electropositive potential less than that of each of the alkali metals and alkali earth metals.

3. A method of preparing fumaric nitrile which comprises heating a mixture of fumaramide, phosphorus pentoxide and from 5 to 50 percent (based on the weight of the fumaramide) of a powder of a metal having an electropositive potential less than that of each of the alkali metals and alkali earth metals.

4. A method of preparing fumaric nitrile which comprises heating a mixture of fumaramide, phosphorus pentoxide and zinc powder.

5. A method of preparing fumaric nitrile which comprises heating a mixture of fumaramide, approximately two moles of phosphorus pentoxide for every three moles of fumaramide, and zinc powder.

6. A method of preparing fumaric nitrile which comprises heating a mixture of fumaramide, phosphorus pentoxide and from 5 to 50 percent (based on the weight of the fumaramide) of zinc powder.

7. A method of preparing fumaric nitrile which comprises heating a mixture of fumaramide, phosphorus pentoxide and aluminum powder.

8. A method of preparing fumaric nitrile which comprises heating a mixture of fumaramide, approximately two moles of phosphorus pentoxide for every three moles of fumaramide, and aluminum powder.

9. A method of preparing fumaric nitrile which comprises heating a mixture of fumaramide, phosphorus pentoxide and from 5 to 50 percent (based on the weight of the fumaramide) of aluminum powder.

10. A method of preparing fumaric nitrile which comprises heating a mixture of fumaramide, phosphorus pentoxide and iron powder.

11. A method of preparing fumaric nitrile which comprises heating a mixture of fumaramide, approximately two moles of phosphorus pentoxide for every three moles of fumaramide, and iron powder.

12. A method of preparing fumaric nitrile which comprises heating a mixture of fumaramide, phosphorus pentoxide and from 5 to 50 percent (based on the weight of the fumaramide) of iron powder.

HENRY A. PACE.

REFERENCES CITED

The following references are of record in the file of this patent:

UNITED STATES PATENTS

| Number | Name | Date |
| --- | --- | --- |
| 2,229,219 | Oxley et al. | Jan. 21, 1941 |
| 2,375,005 | Kung | May 1, 1945 |

OTHER REFERENCES

Keiser et al., Am. Chem. Jour., vol. 46, pages 523 to 528 (1911).

McMaster et al., J. Am. Chem. Soc., vol. 40, pages 970–973 (1918).

Wolf et al., Chem. Abstracts, vol. 29, column 3985 (1935).